United States Patent [19]

Kishida et al.

[11] Patent Number: 4,553,521
[45] Date of Patent: Nov. 19, 1985

[54] INTAKE SECONDARY AIR SUPPLY SYSTEM FOR INTERNAL COMBUSTION ENGINES

[75] Inventors: Eiji Kishida; Yoshinobu Isobe, both of Tokyo; Fumio Hara; Shumpei Hasegawa, both of Saitama, all of Japan

[73] Assignee: Honda Giken Kogyo Kabushiki Kaisha, Tokyo, Japan

[21] Appl. No.: 558,605

[22] Filed: Dec. 6, 1983

[30] Foreign Application Priority Data

Dec. 10, 1982 [JP] Japan .............................. 57-217548
Dec. 10, 1982 [JP] Japan .............................. 57-217549

[51] Int. Cl.$^4$ ........................................ F02M 23/04
[52] U.S. Cl. .................................. 123/587; 123/589
[58] Field of Search ............................ 123/585-589

[56] References Cited

U.S. PATENT DOCUMENTS

| | | | |
|---|---|---|---|
| 4,083,341 | 4/1978 | Brettschneider et al. | 123/589 |
| 4,091,783 | 5/1978 | Laprade et al. | 123/589 |
| 4,192,140 | 3/1980 | Yamashita et al. | 123/589 |
| 4,335,699 | 6/1982 | Totsune et al. | 123/587 |
| 4,436,070 | 3/1984 | Akagi et al. | 123/589 |
| 4,449,502 | 5/1984 | Foruhashi | 123/589 |

Primary Examiner—William A. Cuchlinski, Jr.
Attorney, Agent, or Firm—Lyon & Lyon

[57] ABSTRACT

An intake secondary air supply system for adding air to the intake of an internal combustion engine under certain sensed conditions, such as an excessively rich air-fuel ratio detected by an oxygen sensor in the exhaust system, wherein two separate secondary air supply passages are provided and separately controlled by vacuum responsive valves. One of such valves is controlled to open and close over a period of time to provide a changing supply of secondary air while the other valve is connected through a solenoid operated valve to the engine intake to provide an immmediate opening or closing of that secondary air supply. Vacuum controls responsive to engine operating condition serve to operate the vacuum responsive valves although in one embodiment one of such valves is operated by a constant regulated vacuum.

14 Claims, 4 Drawing Figures

INTAKE SECONDARY AIR SUPPLY SYSTEM FOR INTERNAL COMBUSTION ENGINES

The present invention relates to an intake secondary air supply system for an internal combustion engine and in particular to such a system having controlled operation of the air supply system to avoid objectionable variations in engine operation.

In an internal combustion engine equipped in its exhaust system with a three way catalyzer for purifying an exhaust gas, the air-fuel ratio of a mixture is controlled to the vicinity of a stoichiometric ratio in accordance with the running state of the engine because the three way catalyzer acts most effectively when the air-fuel ratio is in the vicinity of the stoichiometric ratio (e.g., 14.7:1). There is an intake secondary air supply system which controls the air-fuel ratio by providing an intake secondary air passage communicating with the engine intake downstream of the throttle valve and by controlling the flow rate of secondary air to flow therethrough.

Conventionally in this type of intake secondary air supply system the air-fuel ratio is controlled by providing an electromagnetic valve in the secondary air passage and by opening and closing the electromagnetic valve in response to the output signal of an oxygen concentration sensor which is disposed in the exhaust system. More specifically, whether the actual air-fuel ratio is rich or lean is determined from the output signal of the oxygen concentration sensor so that the secondary air passage is opened, when the air-fuel ratio is rich, to supply the secondary air to the downstream of the throttle valve whereas the secondary air passage is closed, when the air-fuel ratio is lean, to interrupt the supply of secondary air. Thus, the air-fuel ratio is proportionally controlled by the opening and closing operations of the secondary air passage by the electromagnetic valve and its control range is determined in accordance with the effective area of the secondary air passage. For the larger effective area, the difference between the flow rates of the intake secondary air when the electromagnetic valve is opened and closed becomes the larger so that the air-fuel ratio can be controlled over a wide range. However, there arises a problem that if the effective area of the secondary air passage is enlarged to provide a wider range of operation control the fluctuating range for the normally set air-fuel ratio is enlarged by the difference in the secondary air flow rate between the opening and closing operations of the electromagnetic valve so that a surging phenomena of fluctuating engine r.p.m. is caused to adversely effect the running performance.

It is, therefore, an object of the present invention to provide an intake secondary air supply system which makes it possible to control the air-fuel ratio over a wide range, while improving the running performance of the engine, in accordance with the engine running state.

According to the present invention, there is provided an intake secondary air supply system comprising: two intake secondary air passages communicating with the intake passage of an internal combustion engine downstream of a throttle valve; an oxygen concentration sensor disposed in an exhaust system; judging means for judging an air-fuel ratio on the basis of the output signal level of the oxygen concentration sensor to generate a rich signal when the air-fuel ratio is in a rich range; a control valve disposed in one of the intake secondary air passages and adapted to be opened in response to the rich signal; an air flow rate control valve disposed in the other intake secondary air passage for varying the effective area of the other intake secondary air passage in accordance with the fluid pressure supplied; and integration means for supplying the flow rate control valve with a fluid pressure which varies such that the effective area is gradually increased in the presence of the rich signal and is gradually decreased in the absence of the rich signal, whereby the proportional control and the integral control are conducted by the actions of the control valve and the flow rate control valve, respectively. In a second embodiment of this invention the air flow rate control valve varies the effective area of the other intake secondary air passage in accordance with the pressure in a vacuum chamber; and the integration means provides communication between a constant vacuum source and the vacuum chamber in the presence of the rich signal in a manner to gradually increase the effective area and for interrupting the communication between the constant vacuum source and the vacuum chamber in the absence of the rich signal in a manner to gradually decrease the effective area, whereby the proportional control and the integral control are conducted by the actions of the control valve and the air flow rate control valve, respectively.

The present invention will be described in the following in connection with two embodiments thereof with reference to the accompanying drawings wherein.

Figure 1:
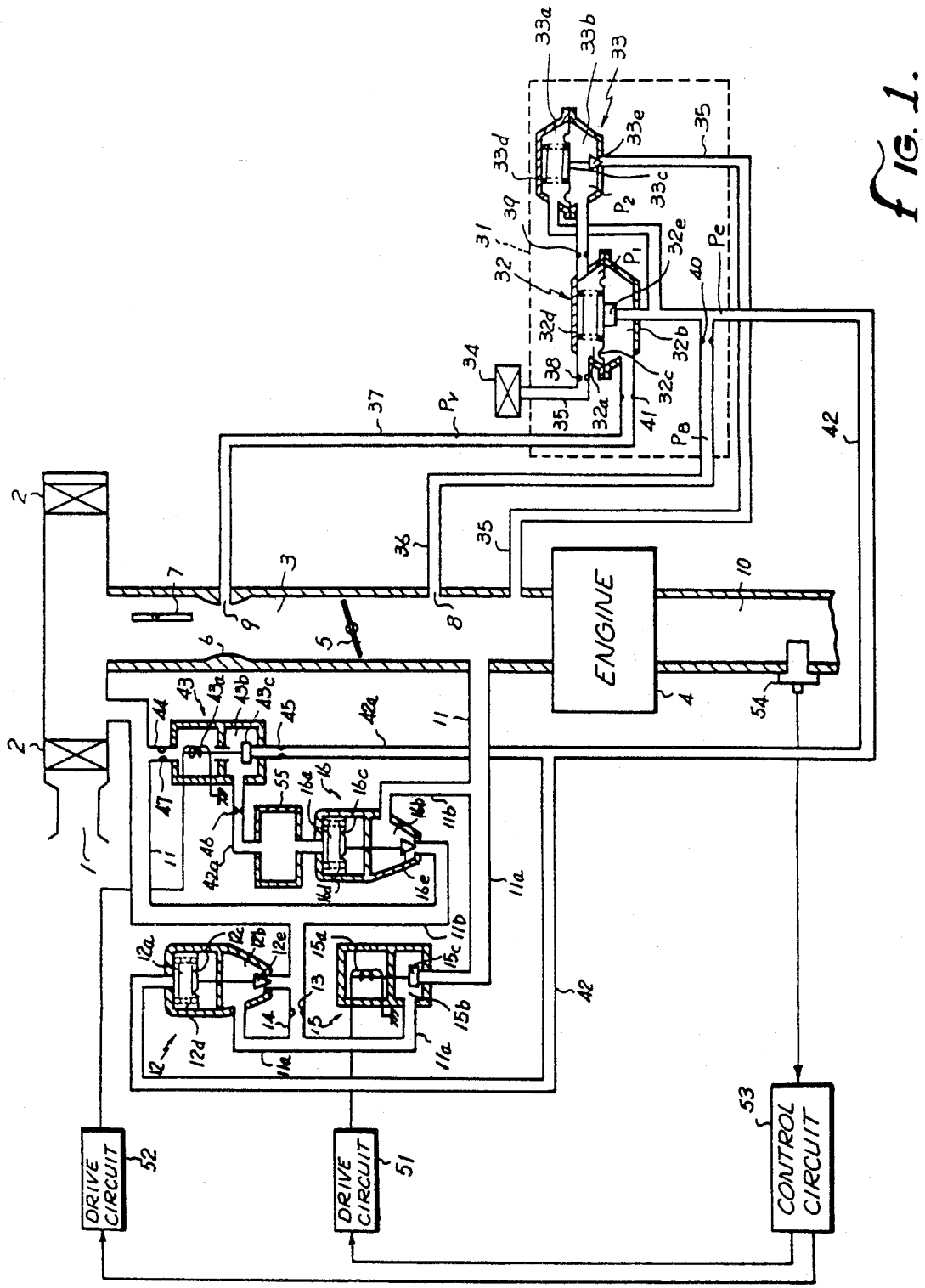
FIG. 1 is a diagrammatic drawing of the circuit and components of the first embodiment of this invention.

In the intake secondary air supply system shown in FIG. 1 in accordance with one embodiment of the present invention, the intake air is supplied from an atmosphere inlet port 1 through an air filter 2 and an intake passage 3 to an engine 4. The intake passage 3 is equipped with a throttle valve 5, formed with a venturi 6 of a carburetor upstream of the throttle valve 5 and equipped with a choke valve 7 upstream of the venturi 6. The intake passage 3 is formed with a vacuum detecting hole 8 in its inner wall in the downstream of the throttle valve 5, and the venturi 6 is also formed with a vacuum detecting hole 9.

An intake secondary air passage 11 is adapted to provide communication between the downstream of the throttle valve 5, (i.e., in the intake manifold) and the vicinity of the air discharge port of the air filter 2. The secondary air passage 11 is formed in its midway with two air control passages 11a and 11b which are juxtaposed to each other so as to shunt the secondary air. The former air control passage 11a is equipped with an air control valve 12. This air control valve 12 is constructed of: a vacuum chamber 12a; a valve chamber 12b forming a part of the air control passage 11a; a diaphragm 12c forming a part of the vacuum chamber 12a; a valve spring 12d disposed in the vacuum chamber 12a; and a needle-type valve member 12e which is disposed in the valve chamber 12b such that it is biased through the diaphragm 12c by the action of the valve spring 12d normally to shut off the air control passage 11a. The air control valve 12 is designed to vary the effective area of the air control passage 11a in accordance with the level of the vacuum acting upon the vacuum chamber 12a such that the effective area of the passage is made larger as the vacuum level becomes higher. In a manner to bypass the air control valve 12, there is provided an air compensating passage 14 having an orifice 13 which is used for idle adjustment. Moreover, the air control passage 11a is equipped with an electromagnetic valve 15 downstream of the air control valve 12. The electromagnetic valve 15 is constructed of: a solenoid 15a; a valve chamber 15b forming a part of the air control passage 11a; and a valve member 15c disposed in the valve chamber 15b and coupled magnetically with the solenoid 15a. The electromagnetic valve 15 thus constructed is adapted to provide communication of the air control passage 11a when the solenoid 15a is energized.

The air control passage 11b is equipped with an air control valve 16. This air control valve 16 is constructed like the air control valve 12 and has a vacuum chamber 16a, a valve chamber 16b, a diaphragm 16c, a valve spring 16d and a needle-type valve member 16e. In accordance with the level of the vacuum acting upon the vacuum chamber 16a, the air control valve 16 varies the effective area of the air control passage 11b so that the effective area is made larger as the vacuum becomes the higher.

The vacuum acting upon the vacuum chambers 12a and 16a of the air control valves 12 and 16 is controlled by a vacuum control assembly 31. This vacuum control assembly 31 is constructed of a vacuum responding type regulator valve 32 and an air valve 33. The regulator and air valves 32 and 33 are constructed of vacuum chambers 32a and 33a, valve chambers 32b and 33b, diaphragms 32c and 33c, valve springs 32d and 33d, and valve members 32e and 33e, respectively. The vacuum chamber 32a is disposed midway of a control intake passage 35 which extends from an atmosphere inlet port 34 having a filter to the downstream of the throttle valve 5. The valve chamber 33b of air valve 33 is positioned in the control intake passage 35 downstream of the vacuum chamber 32a of regulator valve 32. The valve member 33e is biased by the valve spring 33d through the diaphgram 33c to shut off the control intake passage 35. The vacuum chamber 33a is made to communicate with the vacuum detecting hole 8 through a vacuum passage 36 whereas the valve chamber 32b is made to communicate with the vacuum detecting hole 9 through a vacuum passage 37. The valve chamber 32b is made to communicate with the vacuum passage 36, and the valve member 32e is biased by the valve spring 32d through the diaphragm 32c to shut off the passage extending from the valve member 32b to the vacuum passage 36. Incidentally, the control intake passage 35 is formed with an orifice 38 and an orifice 39 upstream and downstream, respectively, of the vacuum chamber 32a. The vacuum passage 36 is formed with an orifice 40 and the vacuum passage 37 is formed with an orifice 41 upstream of their connection to any components in the vacuum control assembly 31.

The vacuum passage 36 is made to communicate with the vacuum chamber 12a of the air control valve 12 by way of a vacuum supply passage 42 at its portion extending from the orifice 40 to the valve chamber 32b and the vacuum chamber 33a. A vacuum supply passage 42a is branched from midway of the vacuum supply passage 42 and is made to communicate with the vacuum chamber 16a of the air control valve 16. The vacuum supply passage 42a thus branched is equipped with an electromagnetic valve 43. This electromagnetic valve 43 is constructed of: a solenoid 43a; a valve chamber 43b forming a part of the vacuum supply passage 42a; and a valve member 43c disposed in the valve chamber 43b and coupled magnetically with the solenoid 43a. The valve chamber 43b is made to communicate with the secondary air passage 11 upstream of the air control valves 12 and 16 by way of an atmospheric pressure supply passage 44 thereby to shut off the vacuum supply passage 42a at the side of the vacuum control assembly 31, when the solenoid 43a is deenergized, and to provide communication therethrough between the vacuum supply passage at the side of the vacuum chamber 16a and the atmospheric pressure supply passage 44. The vacuum supply passage 42a is formed with orifices 45 and 46 at both the sides of the chamber 43b of the electromagnetic valve 43 whereas the atmospheric pressure supply passage 44 is also formed with an orifice 47. Moreover, the vacuum supply passage 42a is formed with a surge tank 55 between the orifice 46 and the vacuum chamber 16a.

A control circuit 53 is connected with the solenoids 15a and 43a through drive circuits 51 and 52, respectively. The control circuit 53 has connected thereto an oxygen concentration sensor 54 which is disposed in the exhaust passage 10 of the engine 4. The oxygen concentration sensor 54 is adapted to generate a voltage at a level corresponding to the oxygen concentration in the engine exhaust gas.

In the intake secondary air supply system having the construction thus far described according to the present invention, the operations of the vacuum control portion 31 will first be described in the following. When a vacuum $P_B$ is exerted upon the vacuum chamber 33a from the vacuum detecting hole 8 by way of the vacuum passage 36 by the running operation of the engine 4, the valve member 33e is moved in the valve opening direction if that vacuum $P_B$ overcomes the biasing force of the valve spring 33d. When the air valve 33 is opened, the atmospheric air flows into the intake passage 3 downstream of the throttle valve 5 from the atmosphere inlet port 34 by way of the control intake passage 35. The magnitudes of vacuum $P_1$ of the vacuum chamber 32a and the vacuum $P_2$ of the valve chamber 33b, through which that atmospheric air passes, are determined by the aperture ratio of the orifices 38 and 39.

Next, when the difference between the vacuum Pv to be exerted upon the valve chamber 32b from the vacuum detecting hole 9 and the vacuum $P_1$ exceeds the biasing force by the valve spring 32d, the valve member 32e is moved in the valve opening direction. When the regulator valve 32 is opened, a portion of the vacuum Pv dilutes the vacuum, which has passed through the orifice 40, to change that vacuum into a vacuum Pe, which acts upon the vacuum chamber 12a and also upon the vacuum chamber 16a when the electromagnetic valve 43 is opened.

Next, the opening of the air valve 33 is reduced by the drop of the vacuum Pe so that the flow rate of the air flowing through the control intake passage 35 is also reduced. In accordance with the reduction in the air flow rate, the vacuum $P_1$ of the vacuum chamber 32a is dropped to bring the regulator valve 32 into its closed state. When the vacuum Pe is again raised, the operations described in the above are repeated, and the pressure ratio between the vacuum Pv and Pe becomes equal to that between the vacuums $P_1$ and $P_2$ because the repeating operations are conducted at a high speed.

As a result, the opening of the regulator valve 32 is enlarged to drop the vacuum Pe because the vacuum $P_1$ is higher than the vacuum Pv when the engine 4 has a small main suction. Since the vacuum Pv is raised to the higher level as the main suction is increased, the opening of the regulator valve 32 is decreased to raise the vacuum Pe. Since this vacuum Pe acts upon both the vacuum chamber 33a and the vacuum chambers 12a and 16a to open the air valve 33 and the air control valves 12 and 16, the flow rate of the air through the control intake passage 35 and the flow rate of the secondary air through the air control passages 11a and 11b when the electromagnetic valves 15 and 43 are open become proportional to each other, and the flow rate of the main intake air flowing through the intake passage 3 to the engine 4 and the flow rate of the secondary air flowing through the air control passages 11a and 11b when the electromagnetic valves 15 and 43 are opened become proportional to each other. Therefore, the vacuum Pe takes a level which is proportional to the flow rate of the main air.

The operations of the control circuit 53 will be described in the following in accordance with the flow chart of FIG. 3. The control circuit 53 first reads out the output voltage level of the oxygen concentration sensor 54 when it is supplied with electric power from the ignition switch (not shown) turned on (Step 1). The oxygen concentration sensor 54 produces an output voltage $V_{02}$ that increases to a higher level for an oxygen richer atmosphere. After having read out the output voltage $V_{02}$ of the oxygen concentration sensor 54, the control circuit 53 discriminates the air-fuel ratio of the mixture from that output voltage $V_{02}$ (Step 2). In this discriminating operation, whether the air-fuel ratio belongs to a rich or lean region is determined on the basis of whether the output voltage $V_{02}$ of the oxygen concentration sensor 54 is higher or lower than a reference voltage Vr corresponding to the stoichiometric air-fuel ratio. In the case of $V_{02} < V_r$, it is determined that the air-fuel ratio is lean, and the lean signal is fed to the drive circuits 51 and 52 so as to control the air-fuel ratio to a richer side (Step 3). On the other hand, in the case of $V_{02} \geq V_r$, it is determined that the air-fuel ratio is rich, and the rich signal is fed to the drive circuits 51 and 52 so as to control the air-fuel ratio to a leaner side (Step 4).

The drive circuits 51 and 52 render the electromagnetic valves 15 and 43 inoperative or closed as a result of the deenergization of the solenoids 15a and 43a in response to the lean signal and render the same operative or open as a result of the energization of the solenoids 15a and 43a in response to the rich signal. First of all, when the electromagnetic valves 15 and 43 are inoperative, the former valve 15 shuts off the air control passage 11a, and the latter valve 43 shuts off the vacuum supply passage 42a at that side of the vacuum control assembly 31 and provides communication between the vacuum supply passage 42a at the side of the vacuum chamber 16a and the atmospheric pressure supply passage 44. As a result, the vacuum in the vacuum chamber 16a is dropped so that the valve member 16e of the air control valve 16 is moved in the closed direction to shut off the air control passage 11b. Since no secondary air is supplied to the engine 4 from the secondary air passage 11 when the air control passages 11a and 11b are closed, the air-fuel ratio of the mixture is controlled to a richer side. Next, when the electromagnetic valves 15 and 43 are changed from their inoperative states to their operative or open states, the electromagnetic valve 15 is instantly opened so that the secondary air flows at a rate corresponding to the opening of the air control valve 12, i.e., at a rate proportional to the main intake air flow rate into the air control passage 11a. At the same time the electromagnetic valve 43 provides the communication of the vacuum supply passage 42a at the side of the vacuum control assembly 31 and blocks the passage to the atmospheric pressure supply passage 44 so that the vacuum Pe is introduced into the vacuum chamber 16a. Since the pressure in this vacuum chamber 16a gradually approaches the vacuum Pe, the air control valve 16 is opened to start the introduction of the secondary air into the air control passage 11b. As the vacuum in the vacuum chamber 16a approaches the vacuum Pe, the opening of the air control valve 16, i.e., the effective area of the air control passage is gradually increased to increase the flow rate of the secondary air. As a result, the secondary air flowing through the air control passages 11a and 11b is additionally supplied through the secondary air passage 11 to the engine 4 so that the air-fuel ratio of the mixture is controlled to a lean side. Thus, the flow rate of the secondary air to be fed to the engine 4 is increased with the time. Incidentally, when the vacuum in the vacuum chamber 16a becomes equal to the vacuum Pe, the flow rate of the secondary air through the air control passage 11b becomes proportional to the flow rate of the main air so that the engine 4 is supplied with the secondary air at a flow rate proportional to that of the main air. Next, when the electromagnetic valves 15 and 43 are brought from their operative or open states to their inoperative or closed states, the air control passage 11a is instantly shut off by the closed electromagnetic valve 15, and the vacuum supply passage 42a is also shut off by the closed electromagnetic valve 43 to provide communication between the vacuum chamber 16a and the atmospheric pressure supply passage 44 so that the atmospheric pressure is supplied to the vacuum chamber 16a. The pressure in the vacuum chamber 16a gradually approaches the atmospheric pressure so that the effective area of the air control passage 11b is gradually decreased to reduce the flow rate of the secondary air. As a result, even when the air control passage 11a is shut off instantaneously, the secondary air is supplied by way of the air control passage 11b through the secondary air passage 11 to the engine 4 such that its flow rate is decreased over a period of time.

Figure 4:
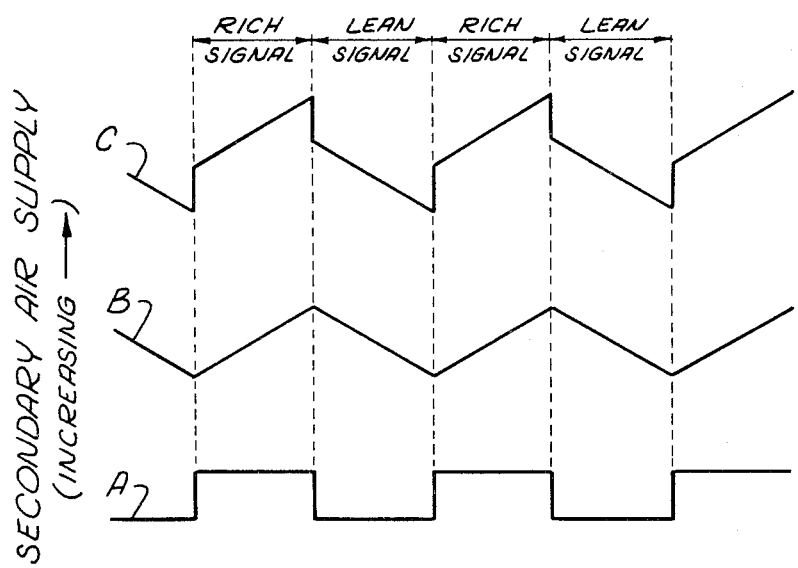
FIG. 4 is a wave form chart illustrating the three (a, b and c) controlling operations of the secondary air flow rate by the systems of FIGS. 1 and 2.

As a result, for the air-fuel ratio to be controlled to a predetermined value, the rich signal and the lean signal are alternately generated in a continuous manner so that the secondary air interruptedly flows by way of the air control passage 11a, as shown by line A in FIG. 4, to control its flow rate in a proportional manner. In the air control passage 11b, on the other hand, the flow rate of the secondary air is increased in the presence of the rich signal and decreased in the presence of the lean signal over a period of time, as shown by line B in FIG. 4, to effect an integral control. Thus the flow rate of the secondary air to flow through the secondary air passage 11 to the engine intake 3 is the summation of those of the proportional control and the integral control, as shown by line C in FIG. 4.

Further, it is preferred that the control circuit 53 detects certain special running states of the engine 4 such as the idle state, the decelerating state or the accelerating state by means of a variety of sensors (not shown) to generate the rich signal or the lean signal irrespective of the output signal level of the oxygen concentration sensor 54, when it detects one of these special engine running states, thereby bringing the electromagnetic valves 15 and 43 into their operative or inoperative states. Also, it is possible to provide controls in accordance with the running state whereby, for example, the rich signal is fed to the drive circuit 51, and the lean signal is fed to the drive circuit 52 so that the secondary air is supplied at a flow rate proportional to the main intake air flow rate to the engine 4 to effect only the proportional control, if desired so.

In the first embodiment thus far described, the vacuum chambers 12a and 16a of the air control valves 12 and 16 are supplied with the vacuum Pe from the common vacuum control assembly 31. In the event it is desirable for the openings of the air control valves 12 and 16 to be controlled independently of each other, there may be provided two vacuum control portions, one of which supplies its vacuum to the vacuum chamber 12a and the other of which supplies its vacuum to the vacuum chamber 16a and one such arrangement is shown in the second embodiment of FIG. 2, hereinafter described more fully. Also in this first embodiment, the vacuum control assembly 31 obtains the vacuum Pe by employing the vacuum downstream of throttle valve 5 and the vacuum in the venturi 6. However, the vacuum Pe may be generated from the vacuum in the vicinity of the throttle valve 5 and the vacuum in the venturi 6, as shown in the second embodiment.

According to the intake secondary air supply system of this first embodiment of the present invention, the two intake secondary air passages communicating with the air intake downstream of the throttle valve are provided so that the air-fuel ratio is controlled by proportionally controlling the flow rate of the secondary air through one of the intake secondary air passages by means of the control valve and by integrally controlling the flow rate of the other intake secondary air passage by means of the fluid pressure responding type flow rate control valve. As a result, if the flow rate of the secondary air to be proportionally controlled is decreased whereas the flow rate of the secondary air to be integrally controlled is increased, the varying range of the air-fuel ratio by the proportional control can be narrowed, and the control range of the air-fuel ratio can be widened. As a result, the surging phenomena can be prevented, and the running performance can be improved because the emission control is facilitated. Moreover, the present invention can also enjoy advantages that the construction is simplified and that the cost can be reduced.

Referring now more particularly to a second embodiment of the present invention illustrated in FIG. 2, the components of the system that are the same or function in the same manner have been given the same identifying numeral as the first embodiment of FIG. 1 and only the new components and any changes in the arrangement of the previously described components will be described hereinafter. In this second embodiment the vacuum detecting hole 8 for the vacuum passage 36 is located at the throttle valve 5 such that it is effectively positioned upstream of the throttle valve 5 when the valve 5 is closed and downstream of the valve 5 when it is open. The vacuum control and operation of air control valve 16 also differs in that vacuum supply passage 42a from the vacuum control assembly 31 is eliminated and the vacuum supply and control is by separate means, as will now be described.

The vacuum chamber 16a is made to communicate with the intake passage 3 downstream of the throttle valve 5 by way of a vacuum supply passage 17. This vacuum supply passage 17 is equipped with an electromagnetic valve 43 identical in construction and operation to valve 43 heretofore described. The valve chamber 43b is made to communicate with the secondary air passage 11 upstream of the air control valves 12 and 16 by way of an atmospheric pressure supply passage 44 thereby to shut off the vacuum supply passage 17 when the solenoid 43a is deenergized and to provide communication between the vacuum chamber 16a and the atmospheric pressure supply passage 44 through the valve chamber 43b. Incidentally, the vacuum supply passage 17 is formed with orifices 45 and 46 on both the sides of the electromagnetic valve 43 and with an orifice 47 on the side of the atmospheric pressure supply passage 44. The vacuum supply passage 17 is equipped with a surge tank 55 on the side of the vacuum chamber 16a from the electromagnetic valve 43 and with a constant vacuum control valve 21 on the side leading to the engine intake 3 on the downstream side of the throttle valve 5 from the electromagnetic valve 43. The constant vacuum control valve 21 stabilizes the vacuum in passage 17 from downstream of the throttle valve 5 at a predetermined level Pr when that vacuum exceeds a predetermined level.

In the intake secondary air supply system having the construction thus far described according to this second embodiment of the present invention, the difference in the operation of the vacuum control assembly 31 will be described. The vacuum Pe generated in the manner previously described acts upon both the vacuum chambers 33a and 12a, but not upon vacuum chamber 16a as in the first embodiment, to open the air valve 33 and the air control valve 12. The flow rate of the air through the control intake passage 35 and the flow rate of the secondary air through the air control passage 11a when the electromagnetic valve 15 is opened become proportional to each other, and the flow rate of the main intake air flowing through the intake passage 3 to the engine 4 and the flow rate of the secondary air flowing through the air control passage 11a when the electromagnetic valve 15 is opened become proportional to each other. Therefore, the vacuum Pe takes a level which is proportional to the flow rate of the main air. On the other hand, when the electromagnetic valve 43 is opened it provides the communication of the vacuum supply passage 17 and blocks the passage to the atmospheric pressure supply passage 44 so that the vacuum Pr is introduced into the vacuum chamber 16a. Since the pressure in this vacuum chamber 16a gradually approaches the vacuum Pr, the air control valve 16 is progressively opened to start the introduction of the secondary air into the air control passage 11b. As the vacuum in the vacuum chamber 16a approaches the vacuum Pr, the opening of the air control valve 16, i.e., the effective area of the air control passage is gradually increased to increase the flow rate of the secondary air. As a result, the secondary air flowing through the air control passages 11a and 11b is additionally supplied through the secondary air passage 11 to the engine 4 so that the air-fuel ratio of the mixture is controlled to a lean side. Thus, the flow rate of the secondary air to be fed to the engine 4 is increased with the passage of time.

Next, when the electromagnetic valves 15 and 43 are brought from their operative open states to their inoperative closed states, the air control passage 11a is instantly shut off by the closed electromagnetic valve 15, and the vacuum supply passage 17 is also shut off by the closed electromagnetic valve 43 to provide communication between the vacuum chamber 16a and the atmospheric pressure supply passage 44 so that the atmospheric pressure is supplied to the vacuum chamber 16a. The pressure in the vacuum chamber 16a gradually approaches the atmospheric pressure so that the effective area of the air control passage 11b is gradually decreased to reduce the flow rate of the secondary air. As a result, even if the air control passage 11a is shut off, the secondary air is supplied by way of the air control passage 11b through the secondary air passage 11 to the engine 4 such that its flow rate is decreased with time.

Figure 2:
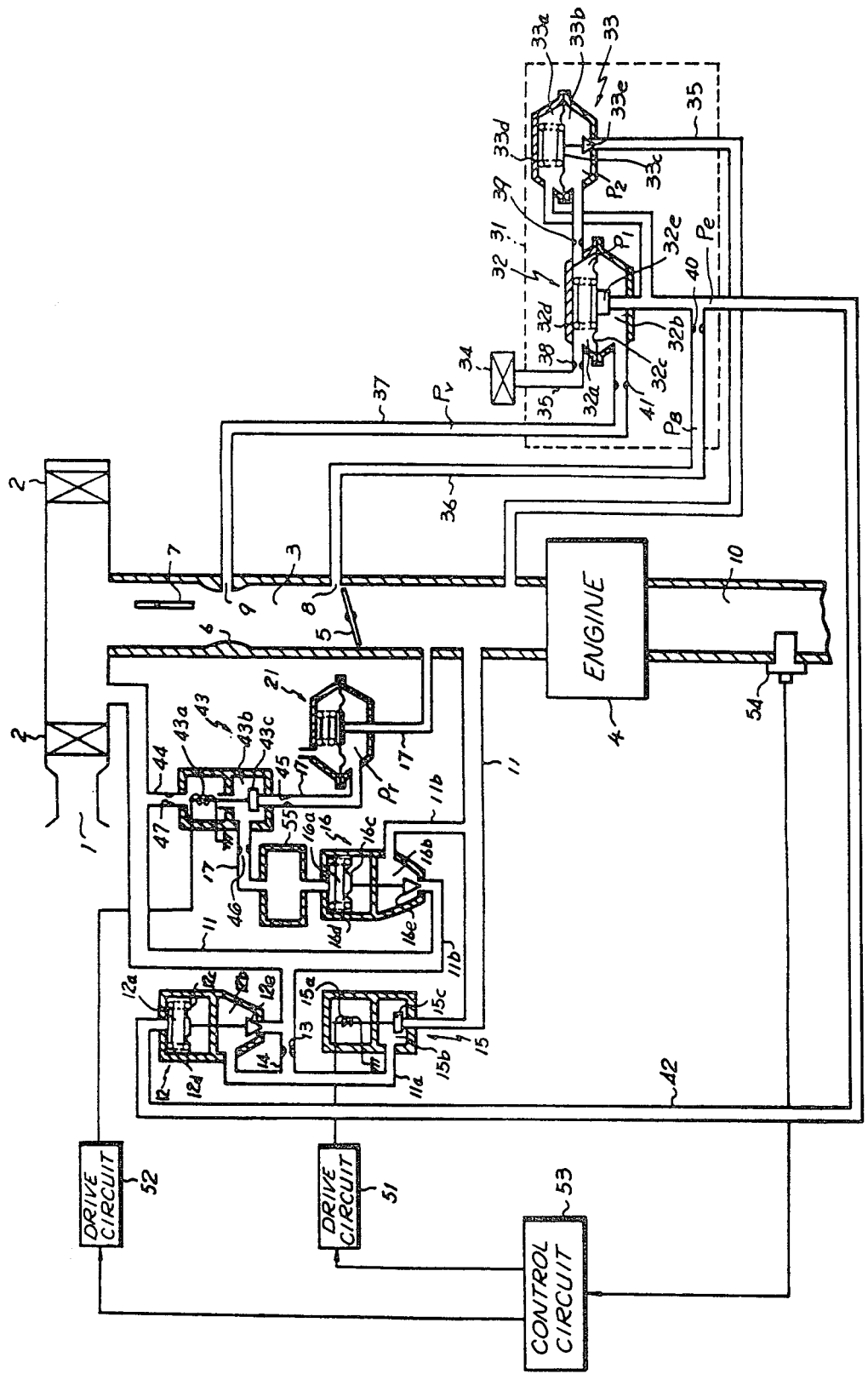
FIG. 2 is a diagrammatic drawing of the circuit and components of a second embodiment of this invention.
Figure 3:
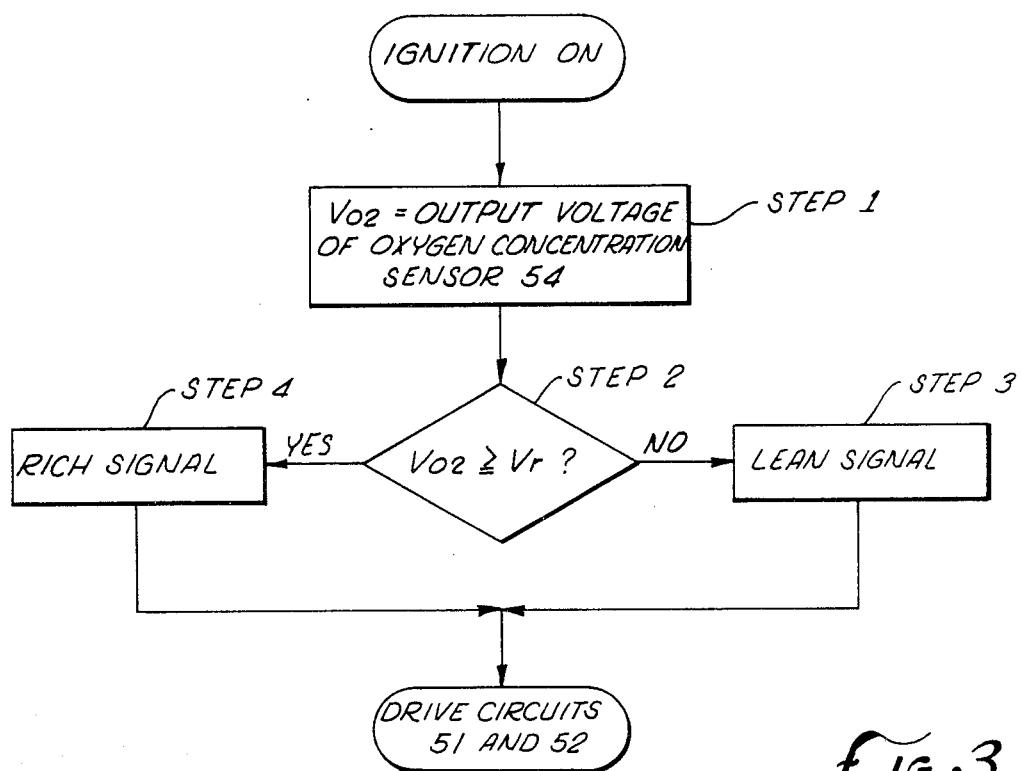
FIG. 3 is a flow chart illustrating the operations of the control circuit used in the embodiments of FIGS. 1 and 2.

This second embodiment of the invention illustrated in FIG. 2 is controlled in the same general manner illustrated in FIG. 3 and performs in the same general manner as illustrated in FIG. 4 as previously described relative to the first embodiment illustrated in FIG. 1.

According to this second embodiment of the intake secondary air supply system of the present invention, two intake secondary air passages communicating with the engine intake downstream of the throttle valve are provided so that the air-fuel ratio is controlled by proportionally controlling the flow rate of the secondary air through one of the intake secondary air passages in response to the rich signal by means of the control valve and by integrally controlling the flow rate of the other intake secondary air passage by means of the air control valve which is supplied at its vacuum chamber with the constant vacuum in response to the rich signal. As a result, if the flow rate of the secondary air to be proportionally controlled is decreased whereas the flow rate of the secondary air to be integrally controlled is increased, the varying range of the air-fuel ratio by the proportional control can be narrowed, and the control range of the air-fuel ratio can be widened. As a result, the surging phenomena can be prevented, and the running performance can be improved because the emission control is facilitated.

In the vehicular internal combustion engine equipped with the intake secondary air supply system according to this second embodiment of the present invention, furthermore, since the vacuum downstream of the throttle valve is so high at the start of the vehicle that a constant vacuum can be obtained, this constant vacuum can be exerted upon the vacuum chamber of the air control valve at the instant when the rich signal is generated at the start. As a result, the responsiveness to the air-fuel ratio control instruction toward the lean side at the start can be improved to shorten the time delay before the air-fuel ratio reaches its predetermined value so that the noxious content (e.g., CO or HC) in the engine exhaust gas at the start can be reduced.

What is claimed:

1. An intake secondary air supply system for an internal combustion engine having an exhaust system and an air intake passage with a throttle valve, comprising: two intake secondary air passages communicating with the engine air intake passage downstream of the throttle valve; an oxygen concentration sensor disposed in the exhaust system for generating an output signal; means for judging the air-fuel ratio on the basis of the output signal level of said oxygen concentration sensor to generate a rich signal when said air-fuel ratio is in a rich range; a control valve disposed in one of said intake secondary air passages and adapted to be opened in response to said rich signal; a flow rate control valve having a fluid chamber for causing the operation thereof; said flow rate control valve disposed in the other of said intake secondary air passages for varying the effective area of said other intake secondary air passage in accordance with the fluid pressure supplied to said fluid chamber; and integration means for supplying said flow rate control valve with a fluid pressure which varies such that said effective area is gradually increased in the presence of said rich signal and is gradually decreased in the absence of said rich signal.

2. An intake secondary air supply system as set forth in claim 1, wherein vacuum control means are provided and a first air control valve having a first vacuum chamber is disposed in said one intake secondary air passage for varying the effective area of said one intake secondary air passage in accordance with the pressure in said first vacuum chamber such that said first vacuum chamber is supplied with a controlled vacuum from said vacuum control means.

3. An intake secondary air supply system as set forth in claim 2, wherein said vacuum control means includes: a first vacuum passage extending from the vicinity or downstream of the throttle valve of said intake passage; a second vacuum passage extending from the inside of the venturi in the intake passage upstream of the throttle valve; a control intake passage extending from an atmosphere inlet port to the downstream of said throttle valve; a vacuum responding type regulator valve having a third vacuum chamber disposed midway of said control intake passage and a third valve chamber communicating with said second vacuum passage for providing communication between said first vacuum passage and said second vacuum passage through said third valve chamber in accordance with the pressure difference between said third vacuum chamber and said third valve chamber; and a vacuum responding type air valve having a fourth vacuum chamber communicating with said first vacuum passage and a fourth valve chamber disposed midway of said control intake passage downstream of said third vacuum chamber for providing communication of said control intake passage with an opening according to the pressure difference between said fourth vacuum chamber and said fourth valve chamber, whereby the vacuum acting upon said fourth vacuum chamber is provided as said control vacuum.

4. An intake secondary air supply system as set forth in claim 1, wherein said flow rate control valve includes a second air control valve for varying the effective area of said other intake secondary air passage in accordance with the pressure in said fluid chamber.

5. An intake secondary air supply system as set forth in claim 1, wherein said integration means includes an electromagnetic valve for supplying a controlled vacuum to said fluid chamber in the presence of said rich signal and the atmospheric pressure to said fluid chamber in the absence of said rich signal.

6. An intake secondary air supply system for an internal combustion engine having an air intake with a throttle valve and an exhaust system, comprising: two intake secondary air passages communicating with the air intake of the engine downstream of the throttle valve; an oxygen concentration sensor disposed in the exhaust system for generating a signal; means for judging the air-fuel ratio on the basis of the output signal level of said oxygen concentration sensor to generate a rich signal when said air-fuel ratio is in a rich range; a control valve disposed in one of said intake secondary air passages and adapted to be opened in response to said rich signal; an air control valve having a first vacuum chamber for causing the operation of that valve; said air control valve disposed in the other of said intake secondary air passages for varying the effective area of said other intake secondary air passage in accordance with the pressure in a first vacuum chamber; and integration means for providing the communication between a constant vacuum source and said first vacuum chamber in the presence of said rich signal in a manner to gradually increase said effective area and for interrupting the communication between said constant vacuum source and said first vacuum chamber in the absence of said rich signal in a manner to gradually decrease said effective area.

7. An intake secondary air supply system as set forth in claim 6, wherein a vacuum control means is provided and a second air control valve having a second vacuum chamber is disposed in said one intake secondary air passage for varying the effective area of said one intake secondary air passage in accordance with the pressure in said second vacuum chamber such that said second vacuum chamber is supplied with a control vacuum from said vacuum control means.

8. An intake secondary air supply system for an internal combustion engine having an exhaust system and an air intake passage with a throttle valve, comprising: at least two intake secondary air passages communicating with the engine air intake passage downstream of the throttle, means for sensing a rich air-fuel ratio and producing an output signal, valve means in each said intake secondary air passage responsive to the output signal to cause opening of the valve means, at least one said valve means progressively opening and closing over a period of time in response to said output signal for varying the secondary air supply therethrough over such time period, and at least another said valve means being fully opened or closed in response to said output signal.

9. The intake secondary air supply system of claim 8, wherein said valve means include solenoid operated valves responsive to said output signal.

10. The intake secondary air supply system of claim 8, wherein said valve means includes vacuum pressure responsive valves for controlling the supply of secondary air, and vacuum control means are provided for controlling the magnitude of the vacuum to at least one said vacuum pressure responsive valve.

11. The intake secondary air supply system of claim 10, wherein said vacuum control means varies the vacuum in response to the vacuums present in the engine air intake passage upstream and downstream of the throttle.

12. The intake secondary air supply system of claim 8, wherein means are provided for controlling the operation of at least one of said valve means in response to engine running conditions regardless of the said output signal.

13. The intake secondary air supply system of claim 8 wherein the said output signal causing full opening of the said another valve means also causes the start of the progressive opening of the said one valve means.

14. The intake secondary air supply system of claim 8 wherein said output signal is changed in response the said sensing means sensing a change in the air-fuel ratio between rich and lean, and said output signal change initiates the opening and closing of said valve means in response to sensing a change to rich and lean, respectively, of said air-fuel ratio.

* * * * *